(12) United States Patent
Kim et al.

(10) Patent No.: US 11,416,168 B2
(45) Date of Patent: Aug. 16, 2022

(54) MEMORY CONTROLLER AND STORAGE DEVICE INCLUDING THE SAME

(71) Applicant: FADU Inc., Seoul (KR)

(72) Inventors: Hongseok Kim, Seoul (KR); EHyun Nam, Seoul (KR); Yeong-Jae Woo, Guri-si (KR); Jin-yong Choi, Seongnam-si (KR)

(73) Assignee: FADU Inc., Seoul (KR)

( * ) Notice: Subject to any disclaimer, the term of this patent is extended or adjusted under 35 U.S.C. 154(b) by 42 days.

(21) Appl. No.: 17/091,085

(22) Filed: Nov. 6, 2020

(65) Prior Publication Data

US 2021/0141559 A1 May 13, 2021

Related U.S. Application Data

(60) Provisional application No. 62/931,888, filed on Nov. 7, 2019.

(30) Foreign Application Priority Data

Nov. 7, 2019 (KR) .......................... 10-2019-0141816

(51) Int. Cl.
*G06F 3/06* (2006.01)

(52) U.S. Cl.
CPC .......... *G06F 3/0656* (2013.01); *G06F 3/0613* (2013.01); *G06F 3/0653* (2013.01); *G06F 3/0659* (2013.01); *G06F 3/0679* (2013.01)

(58) Field of Classification Search
CPC .... G06F 3/0656; G06F 3/0613; G06F 3/0653; G06F 3/0659; G06F 3/0679
See application file for complete search history.

(56) References Cited

U.S. PATENT DOCUMENTS

2019/0303039 A1\* 10/2019 Teh ........................ G06F 3/0604
2020/0026465 A1\* 1/2020 Jung ..................... G06F 3/0604
(Continued)

FOREIGN PATENT DOCUMENTS

JP          2008-204257 A      9/2008
JP          2012-15584 A       1/2012
(Continued)

OTHER PUBLICATIONS

Korean Office Action dated Jan. 15, 2020 in counterpart Korean Patent Application No. 10-2019-0141816 (5 pages in Korean).
(Continued)

*Primary Examiner* — Nicholas J Simonetti
(74) *Attorney, Agent, or Firm* — NSIP Law

(57) ABSTRACT

A memory controller and a storage device including the same are provided. The memory controller for performing a buffering operation of temporarily storing data to be written to a non-volatile memory and data to be read from the non-volatile memory in a buffer memory includes a buffer request queue configured to store a plurality of buffer write requests requesting data to be temporarily stored in the buffer memory and a plurality of buffer read requests requesting data stored in the buffer memory to be read, a buffer traffic monitor configured to calculate the total amount of requested data in real time by summing the lengths of data specified in the respective buffer write requests and the respective buffer read requests stored in the buffer request queue, and a buffer manager configured to control execution of the buffering operation by setting an execution ratio based on the total amount of requested data calculated in real time.

7 Claims, 6 Drawing Sheets

(56) References Cited

U.S. PATENT DOCUMENTS

2020/0034061 A1* 1/2020 Khalili .................. G06F 3/0659
2021/0255810 A1* 8/2021 Yeon ..................... G06F 3/0659

FOREIGN PATENT DOCUMENTS

| JP | 2019-174941 A | 10/2019 |
| KR | 10-2014-0142793 A | 12/2014 |
| KR | 10-2016-0065661 A | 6/2016 |
| KR | 10-2018-0031289 A | 3/2018 |
| KR | 10-2019-0085644 A | 7/2019 |
| KR | 10-2019-0098394 A | 8/2019 |

OTHER PUBLICATIONS

Korean Office Action dated Oct. 6, 2020 in counterpart Korean Patent Application No. 10-2019-0141816 (5 pages in Korean).
Korean Notice of Allowance dated Jun. 3, 2021 in counterpart Korean Patent Application No. 10-2019-0141816 (2 pages in Korean).

* cited by examiner

MEMORY CONTROLLER AND STORAGE DEVICE INCLUDING THE SAME

CROSS REFERENCE TO RELATED APPLICATIONS

This application claims the benefit of U.S. Provisional Application No. 62/931,888 filed on Nov. 7, 2019 which claims the benefit under 35 USC 119(a) and 365(b) of Korean Patent Application No. 10-2019-0141816, filed on Nov. 7, 2019, in the Korean Intellectual Property Office, the entire disclosure of which is incorporated herein by reference for all purposes.

BACKGROUND

1. Field

The disclosure relates to a memory controller and a storage device including the same, and more particularly, to a memory controller for predicting whether a performance bottleneck will occur by monitoring the traffic of a buffer memory, and accordingly managing the buffer memory, and a storage device including the same.

2. Description of Related Art

Semiconductor memories are categorized into volatile memory and non-volatile memory according to the storage mechanisms of information. Volatile memories include dynamic random access memory (DRAM) and static random access memory (SRAM). Although the volatile memory provides fast read and write speeds, the volatile memory loses stored information when it is powered off. In contrast, the non-volatile memory maintains its stored information even after it is powered off and thus is used as a storage medium for persistent storage devices such as solid-state drives (SSDs). Non-volatile memories include erasable programmable read only memory (EPROM), electrically erasable programmable read only memory (EEPROM), ferroelectric RAM (FRAM), phase change RAM (PRAM), magnetoresistive RAM (MRAM), and flash memory. Particularly, the flash memory is widely used as an audio and video data storage medium for information devices such as a computer, a smartphone, a digital camera, a voice recorder, and a camcorder.

A flash storage device including flash memories uses a buffer memory as a write buffer and a prefetch buffer to improve the processing performance of write and read commands received from a host. However, when a high bandwidth memory (HBM) such as flash memory is used as a storage medium, the buffer memory may experience a performance bottleneck. Since too much host data traffic relative to the storage medium is generated for the buffer memory in the course of processing a write command from the host, unless the buffer memory has an overwhelmingly larger bandwidth than that of the storage medium, the performance bottleneck will occur in the buffer memory. In addition to write buffering, various traffics such as traffic for software code execution or metadata access exist in the buffer memory. In the case of read prefetch, if a read command is not generated for the logical block address (LBA) of the prefetched data, the bandwidth of the buffer memory is wasted, thus increasing the probability of the performance bottleneck.

Accordingly, there is a pressing need for a method of managing the performance bottleneck of a buffer memory, encountered with the conventional flash storage device.

SUMMARY

The present disclosure has been made in an effort to solve the above-mentioned problems of the prior art and an aspect of the present disclosure is to provide a memory controller for managing a buffer memory by determining the possibility of a performance bottleneck through real-time monitoring of traffic in the buffer memory and accordingly restricting execution of write buffering and read prefetch.

According to an embodiment of the disclosure, a memory controller for performing a buffering operation of temporarily storing data to be written to a non-volatile memory and data to be read from the non-volatile memory in a buffer memory includes a buffer request queue configured to store a plurality of buffer write requests requesting data to be temporarily stored in the buffer memory and a plurality of buffer read requests requesting data stored in the buffer memory to be read, a buffer traffic monitor configured to calculate the total amount of requested data in real time by summing the lengths of data specified in the respective buffer write requests and the respective buffer read requests stored in the buffer request queue, and a buffer manager configured to control execution of the buffering operation by setting an execution ratio based on the total amount of requested data calculated in real time.

The memory controller may be configured to execute the buffering operation according to an execution ratio having a specific initial value, and when the total amount of requested data calculated in real time is larger than a preset upper limit, the buffer manager may be configured to decrease the execution ratio.

The buffer manager may be configured to repeatedly decrease the execution ratio until the total amount of requested data calculated in real time is equal to or larger than a preset lower limit and equal to or less than the upper limit.

When the total amount of requested data calculated in real time is less than the lower limit, the buffer manager may be configured to increase the execution ratio.

Even though the total amount of requested data calculated in real time is less than the lower limit, when the set execution ratio is equal to the initial execution ratio, the buffer manager may be configured to maintain the execution ratio.

The buffer manager may be configured to adjust the execution ratio by applying a preset execution ratio variation according to a degree exceeding the upper limit and a degree below the lower limit.

The buffer manager may be configured to divide the buffering operation into write buffering for temporarily storing host data in the buffer memory in response to a write command from a host and read prefetch that temporarily stores data for a second read command expected to be generated by the host in the buffer memory after processing a first read command from the host, and control execution of each of the write buffering and the read prefetch.

The buffer manager may be configured to control execution of the write buffering by setting a first execution ratio, and execution of the read prefetch by setting a second execution ratio equal to or different from the first execution ratio.

The buffer manager may be configured to randomly select some of a plurality of write commands according to the first execution ratio and execute the write buffering only for the selected write commands. The buffer manager may be configured to randomly select some of a plurality of read commands according to the second execution ratio and execute the read prefetch only for the selected first read commands.

According to an embodiment of the disclosure, a storage device includes a non-volatile memory, a buffer memory, and the above-described memory controller.

The features and advantages of the disclosure will become more apparent from the following description based on the attached drawings.

The terms or words used in the specification and claims should not be interpreted in a conventional and lexical sense. Rather, they should be interpreted as meanings and concepts consistent with the technical idea of the disclosure based on the principle that the inventor can appropriately define the concept of terms in order to explain his or her invention in the best way.

According to the present disclosure, it is possible to efficiently manage a buffer memory by dynamically adjusting the execution ratio of write buffering and read prefetch based on the prediction result of the performance bottleneck obtained by inspecting the traffic to the buffer memory in real time, especially when a high bandwidth non-volatile memory is used as a storage medium.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
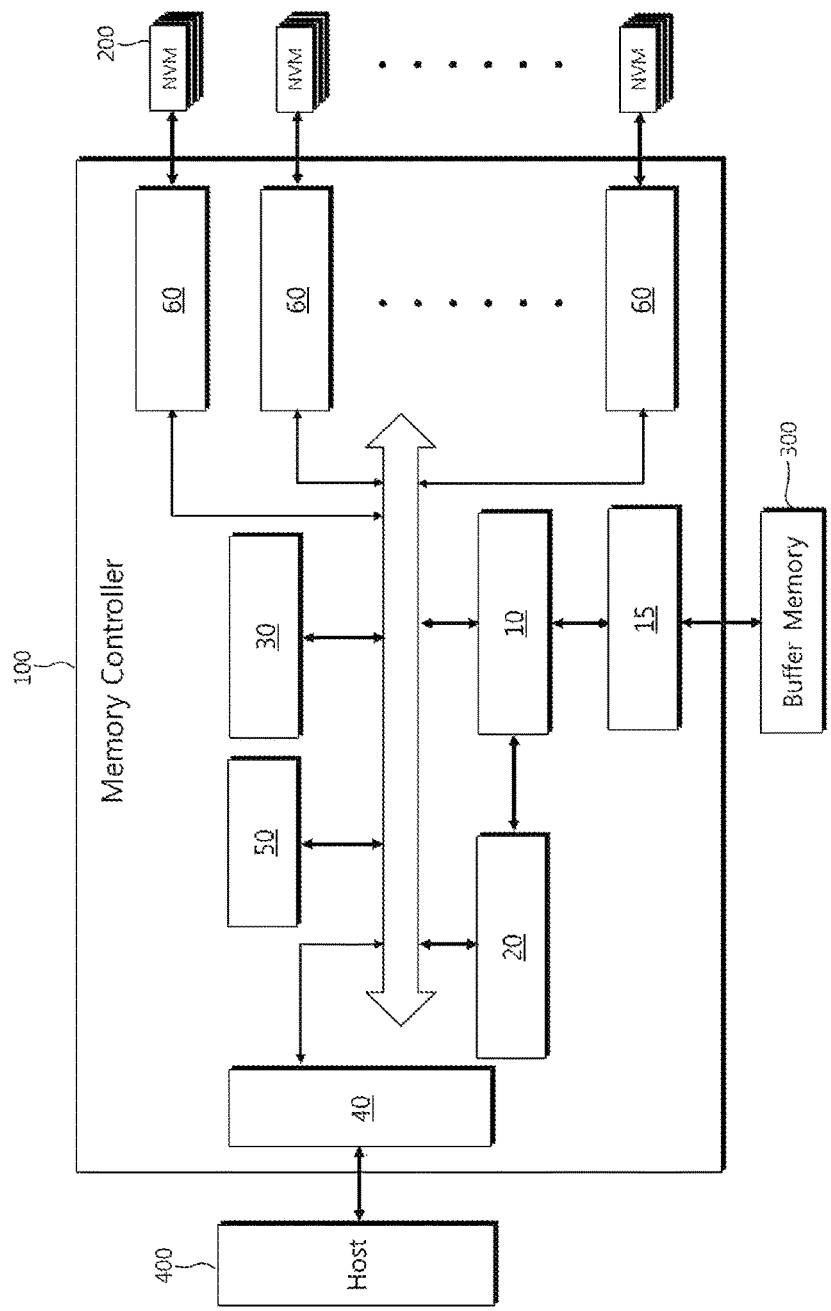
FIG. 1 is a block diagram illustrating a memory controller according to an embodiment of the disclosure.

The objects, specific advantages, and novel features of the disclosure will become more apparent from the following detailed description and preferred embodiments, examples of which are illustrated in the accompanying drawings. The same reference numerals and signs denote the same or like components even when they are shown in different accompanying drawings from one another. The term as used in the disclosure, "$1^{st}$" "$2^{nd}$" "first" or "second' may be used for the names of various components, not limiting the components. These expressions are used only to distinguish one component from another component. Lest it should obscure the subject matter of the disclosure, a detailed description of well-known technologies is avoided.

Preferred embodiments of the disclosure will be described below in detail with reference to the attached drawings.

Figure 2:
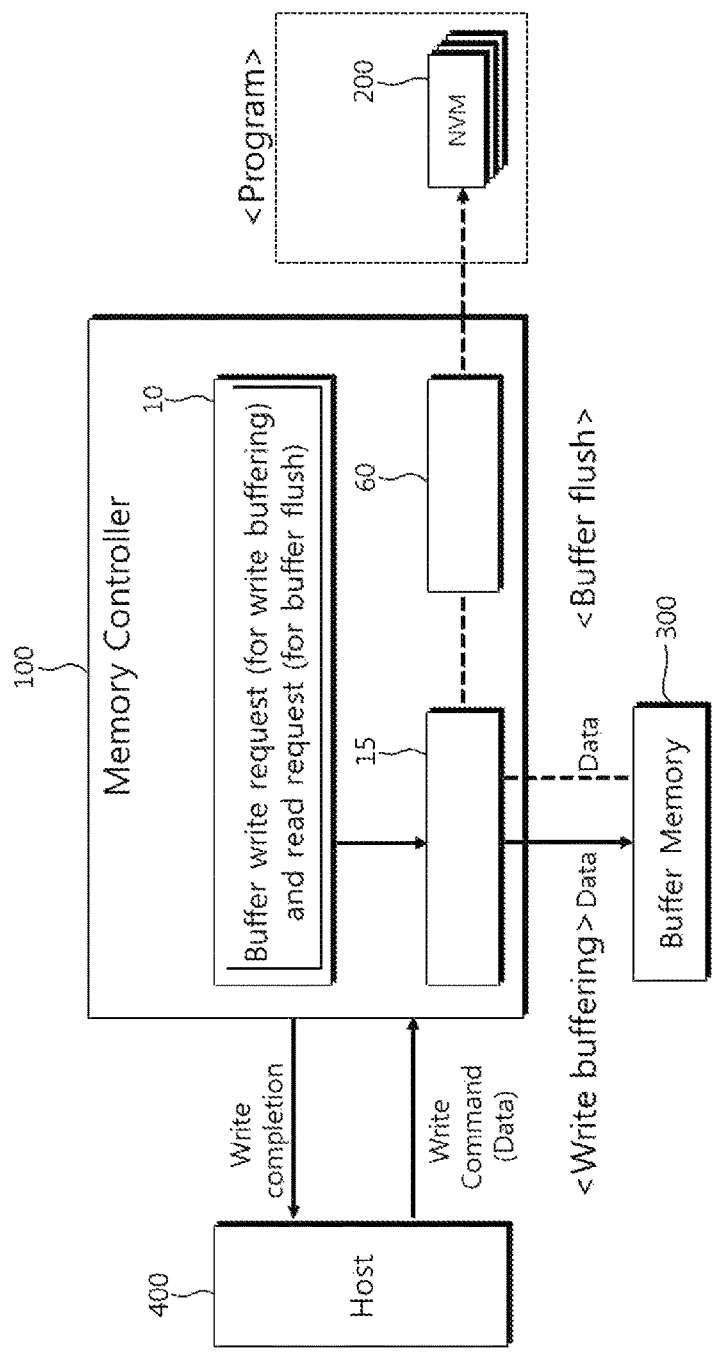
FIGS. 2 and 3 are block diagrams illustrating operations of the memory controller illustrated in FIG. 1.
Figure 3:
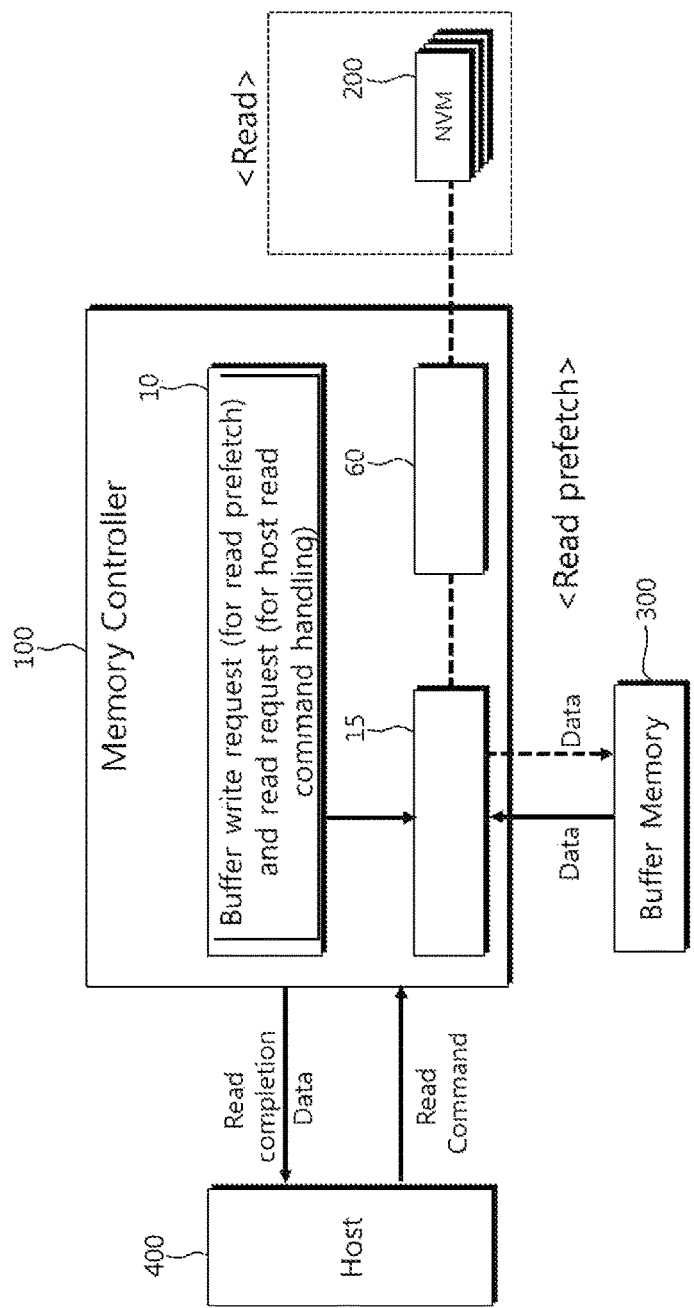

FIG. 1 is a block diagram illustrating a memory controller according to an embodiment of the disclosure, and FIGS. 2 and 3 are block diagrams illustrating operations of the memory controller illustrated in FIG. 1.

Referring to FIGS. 1, 2 and 3, according to an embodiment of the disclosure, a memory controller 100 for performing a buffering operation of temporarily storing data to be written to a non-volatile memory 200 and data to be read from the non-volatile memory 200 in a buffer memory 300 includes a buffer request queue 10 that stores a plurality of buffer write requests requesting temporary storing of data in the buffer memory 300 and a plurality of buffer read requests requesting read-out of data stored in the buffer memory 300, a buffer traffic monitor 20 that calculates the total amount of requested data in real time by summing the lengths of data specified in the plurality of buffer write requests and the plurality of buffer read requests stored in the buffer request queue 10, and a buffer manager 30 that controls the buffering operation by setting an execution ratio based on the total amount of the requested data calculated in real time.

The disclosure relates to a memory controller for controlling a non-volatile memory. The non-volatile memory is a storage medium which may be controlled by the memory controller according to the disclosure and maintain information data even when it is powered off. The non-volatile memory executes operations such as read and program under the control of the memory controller. Non-volatile memories include erasable programmable read only memory (EPROM), electrically erasable programmable read only memory (EEPROM), ferroelectric RAM (FRAM), phase change RAM (PRAM), magnetoresistive RAM (MRAM), and flash memory. A storage device adopting a non-volatile memory as a storage medium may use a buffer memory as a write buffer or a prefetch buffer to increase the processing performance of write and read commands from a host. Since too much read and write data traffic to the buffer memory relative to the non-volatile memory is generated during processing of the host commands, a performance bottleneck may occur in the buffer memory. As a solution to this performance bottleneck, the disclosure has been devised to manage the buffer memory.

Specifically, the memory controller 100 according to the disclosure includes the buffer request queue 10, the buffer traffic monitor 20, and the buffer manager 30.

The buffer request queue 10 is configured as a queue storing at least one buffer write request and/or at least one buffer read request for the buffer memory 300. The memory controller 100 according to an embodiment of the disclosure receives and processes a write command or a read command from a host 400, and may improve command processing performance by using the buffer memory 300. The memory controller 100 may execute write buffering by temporarily storing host data to be written to a non-volatile memory (NVM) 200 in the buffer memory 300 in order to increase a response speed for a host write command, and execute read prefetch of pre-reading data of a logical block address (LBA), to which a host read command is predicted to arrive in the future by analyzing a pattern of host read commands, from the non-volatile memory 200 to the buffer memory 300. In addition to write buffering and read prefetch, multiple buffer write and read requests to the buffer memory 300 occur simultaneously for executing software code or storing metadata, and are stored in the buffer request queue 10.

A buffer write request includes information about a master which has transmitted the request, write address information ADDR1, and data to be written. The write address information ADDR1 includes information about the starting address of a buffer area to be accessed and the length of the data. A buffer read request includes information about a master which has transmitted the request and read address information ADDR2, and the read address information ADDR2 includes information about the starting address of a buffer area in which the data to be read is located and the length of the data.

A request stored in the buffer request queue 10 may be fetched by a buffer memory controller 15 to perform a buffer write and/or read operation. For a buffer write request, the buffer memory controller 15 may generate a signal for buffer writing by using write address information included in the request, transmit the signal to the buffer memory 300, and transmit write data to the buffer memory 300, to perform a buffer write operation. The result of the write operation may be transmitted to a module that has generated the request according to master information included in the request. For a buffer read request, the buffer memory controller 15 may generate a signal for buffer reading by using read address information included in the request, transmit the signal to the buffer memory 300, receive read data from the buffer memory 300, and return the read data to a target module according to master information included in the request.

The buffer memory 300 is used for temporarily storing data to improve storage performance. Specifically, referring to FIG. 2, when receiving a write command from the host 400, the memory controller 100 may execute write buffering and buffer flush. First, upon receipt of a write command from the host 400, the memory controller 100 allocates a buffer space to the buffer memory 300 and transmits a buffer write request to the buffer request queue 10, to temporarily store host data in the allocated buffer space. When the buffer memory controller 15 processes the buffer write request and successfully returns the result of the buffer write, the memory controller 100 transmits a write completion for the host write command to the host 400. This process is called write buffering. Subsequently, to program the buffered data to the NVM 200, the memory controller 100 transmits a program request for the data to a memory channel controller 60. The memory channel controller 60 receives the data from the buffer memory controller 15 through a buffer read request, performs a program operation on the NVM 20, and returns a program completion. When the program operation is completed, the physical address at which the data has been stored is recorded in a mapping table, and the allocated buffer space is released. This process is called buffer flush. Referring to FIG. 3, when receiving a read command from the host 400, it is first determined whether data for the read command exists in the buffer memory 300. When the data exists in the buffer memory 300, a buffer read request is transmitted to the buffer request queue 10. When the buffer memory controller 15 processes the buffer read request and returns the data, the data and a read completion are transmitted to the host 400. On the contrary, in the absence of the data in the buffer memory 300, a physical address of the NVM 200 at which the data is located is obtained by referring to the mapping table, and a read request is transmitted to the memory channel controller 60. Accordingly, the data from the NVM 200 returned by the memory channel controller 60 and a read completion are transmitted to the host 400. In general, since the buffer memory 300 is accessed faster than the non-volatile memory 200, host read performance can be improved by predicting future host read commands and reading corresponding data from the non-volatile memory 200 to the buffer memory 300 in advance. For example, host data having an LBA successive to that of an already-completed first read command from the host 400 is read out from the NVM 200 and then temporarily stored in the buffer memory 300 in response to a buffer write request. Then, upon arrival of a second read command having the LBA from the host 400, the data may be transmitted from the buffer memory 300 to the host 400. This read-ahead operation is called read prefetch.

Besides the above-described use of the buffer memory 300, various buffer write and read requests such as for software code execution or metadata access may occur. In read prefetch, if a read request for a corresponding LBA is not generated, the bandwidth of the buffer memory 300 is wasted. Accordingly, a performance bottleneck may occur in the buffer memory 300.

The buffer traffic monitor 20 monitors the state of the buffer request queue 10 in real time and determines whether the performance bottleneck has occurred in the buffer memory 300. When the performance bottleneck occurs in the buffer memory 300, a large number of requests are kept non-fetched in the buffer request queue 10 because requests are input to the buffer request queue 10 faster than requests are fetched from the buffer request queue 10. The length of data requested to be written or read may be different in each buffer request, and thus information about data lengths in requests may be used to accurately determine occurrence of the performance bottleneck. In an embodiment, the total amount of data to be written to or read from the buffer memory (hereinafter, referred to as "requested data") may be calculated by summing the lengths of data specified in a plurality of write requests and/or read requests stored in the buffer request queue 10. If the total amount of requested data exceeds a preset upper limit, it may be determined that the performance bottleneck has occurred in the buffer memory 300. On the contrary, if the total amount of requested data is less than a preset lower limit, it may be determined that the bandwidth of the buffer memory 300 has not been fully utilized. If the total amount of requested data is less than or equal to the upper limit and greater than or equal to the lower limit, this may indicate that the bandwidth of the buffer memory 300 is fully utilized and there is no performance bottleneck problem in the buffer memory 300. Accordingly, the buffer manager 30 may efficiently manage the bandwidth of the buffer memory 300 based on the total amount of requested data, calculated by the buffer traffic monitor 20.

The buffer manager 30 sets an execution ratio based on the total amount of requested data calculated in real time by the buffer traffic monitor 20, and controls the buffering operation of temporarily storing data to be written to the NVM 200 and data to be read from the NVM 200 in the buffer memory 300 according to the execution ratio. In this manner, the buffer manager 30 manages the buffer memory 300. Since the buffering operation includes write buffering and read prefetch, the buffer memory 300 may be managed by adjusting a write buffering execution ratio and/or a read prefetch execution ratio. In this case, write buffering and read prefetch may be controlled separately.

The memory controller 100 may perform the buffering operation according to an execution ratio having a specific initial value. When the total amount of requested data for the buffer exceeds the preset upper limit, the memory controller 100 may decrease the execution ratio, and skip the buffering operation (e.g., write buffering and/or read prefetch) according to the execution ratio. For example, if the initial execution ratio is 100% and the total amount of requested data exceeds the preset upper limit, the write buffering execution ratio is decreased to 70%. Then, write buffering is executed for only 70% of host write commands, while for the remaining 30%, write buffering is skipped and data is directly transmitted to the NVM 200 from the host 400. Even though the write buffering execution ratio is limited, if the total amount of requested data calculated in real time exceeds the preset upper limit again, the write buffering execution ratio may further be decreased by a predetermined value. That is, the downward adjustment of the write buffering execution ratio may be repeated until the total amount of requested data calculated in real time becomes less than or equal to the preset upper limit. On the contrary, when the total amount of requested data is less than the preset lower limit, the write buffering execution ratio may be increased by a predetermined value. When the total amount of requested data falls within a desirable range, for example, when the total amount of requested data is less than or equal to the preset upper limit and greater than or equal to the lower limit, the dynamic change of the write buffering execution ratio is discontinued. When the total amount of requested data is not in the above desirable range but satisfies a saturation condition, for example, reaches the initial execution ratio, the write buffering execution ratio may be maintained. In an embodiment, when the total amount of requested data is less than the preset lower limit but the write buffering execution ratio is already saturated to 100% as in the beginning, the ratio adjustment may not be performed. A read prefetch execution ratio is also controlled in the same manner as the afore-mentioned control of a write buffering execution ratio, which will not be described in detail herein.

The write buffering execution ratio and the read prefetch execution ratio may be equal or different. Therefore, when write buffering is controlled by setting a first execution ratio, a second execution ratio equal to or different from the first execution ratio may be set to control read prefetch. Further, the increment and decrement of the write buffering execution ratio and/or the read prefetch execution ratio may be set differently according to the calculated total amount of the requested data. In an embodiment, the execution ratio may be adjusted by applying a predetermined execution ratio variation according to a degree exceeding the upper limit and a degree below the lower limit. For example, execution ratio variations may be set separately for write buffering and read prefetch, as listed in Table 1 below.

TABLE 1

| Total amount of requested data | Variation of write buffering execution ratio | Variation of read prefetch execution ratio |
| --- | --- | --- |
| ≤50 KB | +20 | +40 |
| 50~100 KB | +10 | +20 |
| 100~200 KB | 0 | 0 |
| 200~250 KB | −10 | −30 |
| ≥250 KB | −20 | −60 |

In the above embodiment, the write buffering and read prefetch execution ratio variations according to total amounts of requested data are preset, and the write buffering execution ratio and/or the read prefetch execution ratio is controlled by applying the total amount of requested data calculated in real time by the buffer traffic monitor 20. For example, with the write buffering execution ratio set to 90% and the read prefetch execution ratio set to 70% at a given time, when the total amount of requested data is calculated to be more than 200 KB and less than 2500 KB, the write buffering execution ratio and the read prefetch execution ratio may be changed to 80%(=90−10%) and 40%(=70−30%), respectively by applying the execution ratio variations. When write buffering and/or read prefetch are skipped according to the write buffering execution ratio and/or the read prefetch execution ratio, there is a need for determining a host write command and/or a read command for which write buffering and/or read prefetch is to be skipped. Accordingly, the buffer manager 30 may randomly select some of multiple host write commands and read commands according to the execution ratios, and perform write buffering and read prefetch for the selected commands. In one embodiment, a host command may be randomly selected according to a random number. For example, when a host write command arrives while the write buffering execution ratio is 70%, a random number between 1 and 100 is generated. If the random number is equal to or less than 70, write buffering may be executed. Otherwise, write buffering may be skipped. For a host read command, read prefetch may be performed in the same manner. In this case, the execution ratios of write buffering and read prefetch may be equal or different.

Apart from the performance bottleneck, the buffer manager 30 may restrict write buffering and/or read prefetch by monitoring the buffer area of the buffer memory 300. In this case, the buffer manager 30 may calculate the size of a buffer area in which write data is temporarily stored or read data is prefetched, and restrict write buffering and/or read prefetch based on the calculated size of the buffer area. A threshold may be preset for the buffer area size and compared with the calculated size. When the threshold is exceeded, write buffering and/or read prefetch may be restricted.

The above-described buffer traffic monitor 20 and/or buffer manager 30 may be implemented in hardware or software. That is, the buffer traffic monitor 20 and/or the buffer manager 30 may be implemented in the form of a digital or analog circuit located inside the memory controller 100 or may be implemented as a separate chip or module and connected to the memory controller 100. Further, the buffer traffic monitor 20 and/or the buffer manager 30 may be implemented as software stored in internal memory such as SRAM or external memory such as floppy disk, compact disk, or USB flash drive. Further, the buffer traffic monitor 20 and/or the buffer manager 30 may be implemented in a user-programmable form. Further, the buffer traffic monitor 20 and/or the buffer manager 30 may be integrated into the buffer memory controller 15 or another built-in module.

The memory controller 100 according to the disclosure may further include a host interface 40 as a means for providing an interface with the host 400. The host interface 40 may be connected to the host 400 through at least one channel or port. For example, the host interface 40 may be connected to the host 400 through any one or all of a parallel AT attachment (PATA) bus, a serial AT attachment (SATA) bust, and a peripheral component interconnect express (PCIe) bus. Alternatively, the host interface 40 may be connected to the outside through a small computer system interface (SCSI) or a USB.

Further, the memory controller 100 according to the disclosure may further include the memory channel controller 60 as a means for providing an interface with the NVM 200. The NVM 200 may be implemented as flash memory, PRAM, MRAM, ReRAM, FRAM, or the like, and a plurality of memory channel controllers 60 may be used to support a plurality of NVMs 200. One or more NVMs 200 may be connected to one memory channel controller 60, and NVMs 200 connected to one memory channel controller 60 may share the same data bus.

The memory controller 100 according to the disclosure may further include a processor 50 to process a command from the host 400. The processor 50 may be implemented as a micro control unit (MCU), a central processing unit (CPU), or the like. The processor 50 is a component that processes a write command and a read command received from the host 400, and may control functions of the memory controller 100 by executing software for processing the commands. The processor 50 may execute software such as a flash translation layer (FTL). The FTL may control operations of the memory channel controller 60 and perform garbage collection (GC). The software executed by the processor 50 may be stored in the buffer memory 300.

A detailed description will be given of a memory controller according to the disclosure in embodiments of processing a read command and a write command from a host.

Figure 4:
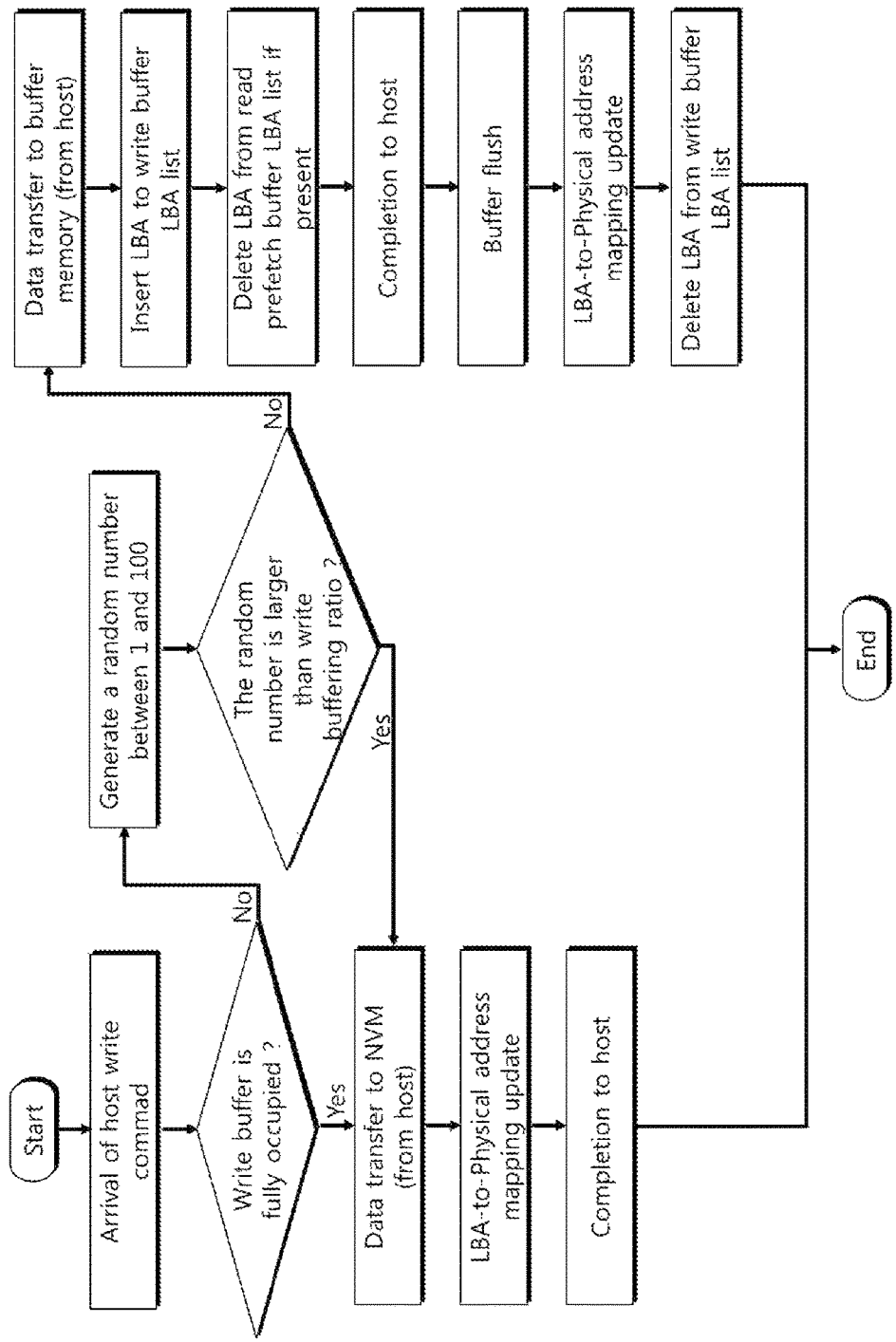
FIGS. 4 and 5 are flowcharts illustrating a method of operating the memory controller according to the disclosure.
Figure 5:
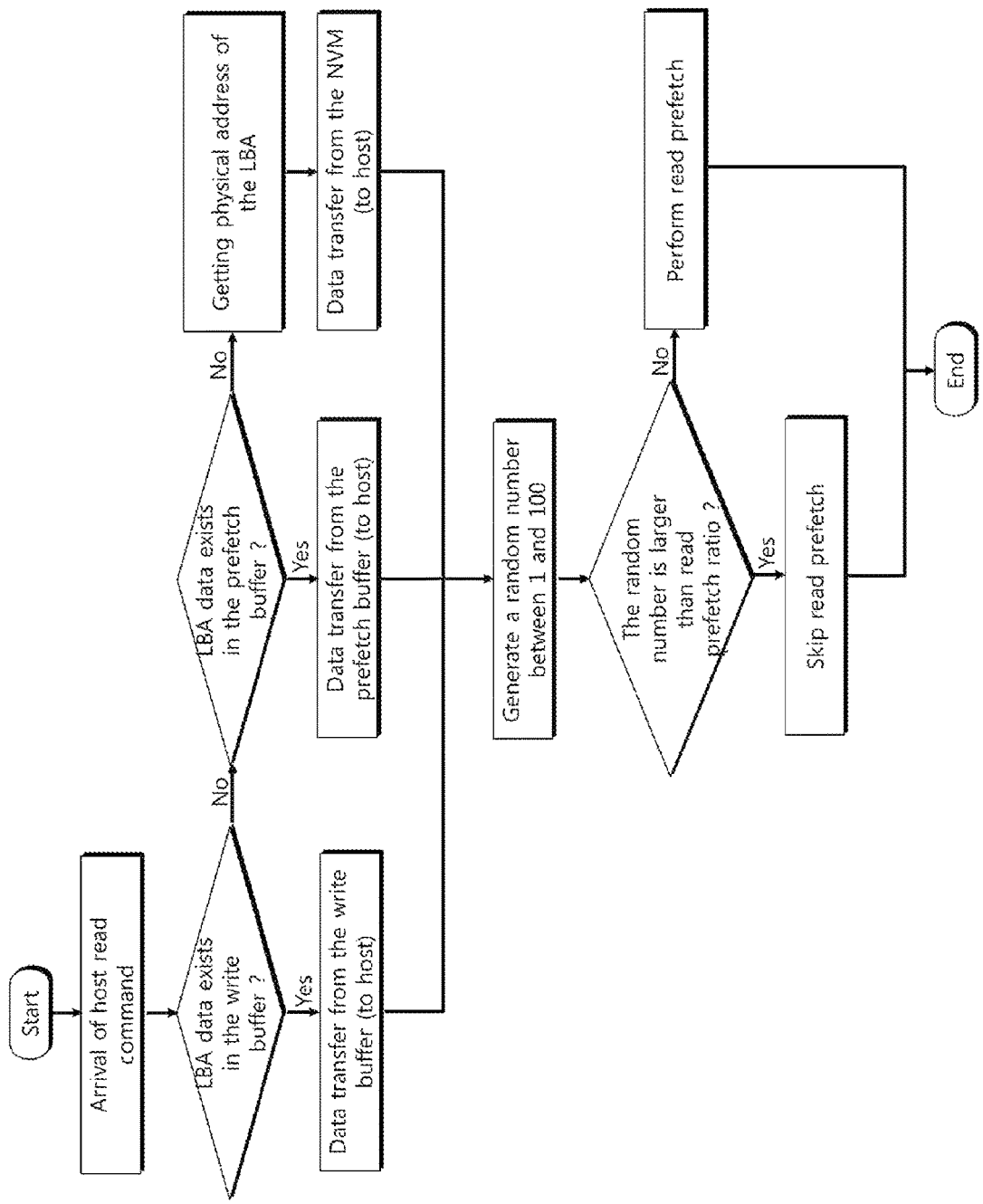

FIGS. 4 and 5 are flowcharts illustrating a method of operating a memory controller according to an embodiment of the disclosure. FIG. 4 illustrates a method of operating the memory controller in relation to a host write command, and FIG. 5 illustrates a method of operating the memory controller in relation to a host read command.

Referring to FIG. 4, upon receipt of a host write command, the memory controller first checks whether the buffer of the buffer memory is fully occupied. If fully occupied, write buffering is impossible because there is no buffer space for the write data. Therefore, the data is transmitted to an NVM from the host directly, and LBA-to-physical address mapping information is updated to record the physical address of the LBA data. Then, a write completion is transmitted to the host. If the buffer is not fully occupied, a random number between 1 and 100 is generated and compared with a write buffering execution ratio. If the random number is greater than the write buffering execution ratio, write buffering is skipped. That is, the same operation as when the buffer is fully occupied is performed. On the contrary, if the random number is less than or equal to the write buffering execution ratio, a write buffer space is allocated to the buffer memory, the data is transmitted to the write buffer space, the LBA of the write data is inserted into a write buffer LBA list, and a write completion is transmitted to the host. In this manner, a series of write buffering operations are performed. In the presence of the LBA of the write data in a read prefetch buffer LBA list, the LBA is deleted from the read prefetch buffer LBA list. Subsequently, buffer flush is executed by transmitting the data stored in the write buffer space to the NVM, and LBA-to-physical address mapping information is updated. Then, the LBA is deleted in the write buffer LBA list.

Referring to FIG. 5, when a read command is received from the host, data corresponding to the read command is searched for in the write buffer of the buffer memory. In the presence of the data, the data is transmitted to the host from the write buffer. In the absence of the data in the write buffer, the data is searched for in a prefetch buffer of the buffer memory. When the data exists in the prefetch buffer, the data is transmitted to the host. If the data does not exist in the buffer memory, the data is transmitted from the NVM to the host. When the data is delivered to the host in this way, read prefetch is executed according to a read prefetch execution ratio. A random number between 1 and 100 is generated. If the random number is greater than the read prefetch execution ratio, read prefetch is skipped. Otherwise, read prefetch is executed.

The memory controller according to the disclosure may be applied to a storage device, which will be described below.

Figure 6:
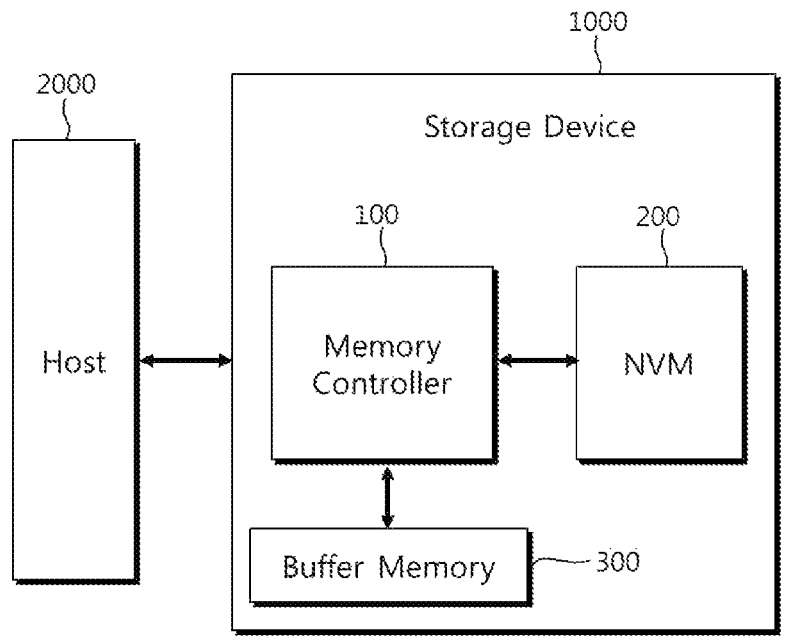
FIG. 6 is a block diagram illustrating a storage device according to an embodiment of the disclosure.
Figure 7:
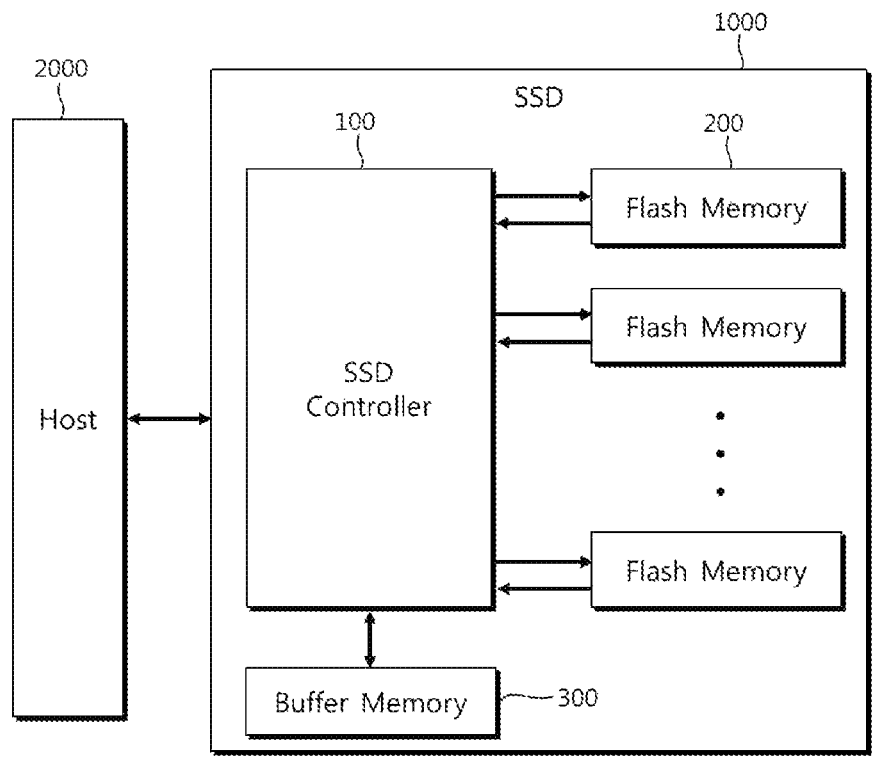
FIG. 7 is a block diagram illustrating a sold-state drive (SSD) to which the storage device according to the embodiment of the disclosure is applied.

FIG. 6 is a block diagram illustrating a storage device according to an embodiment of the disclosure, and FIG. 7 is a block diagram illustrating a solid state drive (SSD) to which a storage device according to an embodiment of the disclosure is applied.

As illustrated in FIG. 6, a storage device 1000 according to an embodiment of the disclosure includes the NVM 200, the buffer memory 300, and the memory controller 100 that controls the NVM 200 and manages the buffer memory 300.

The storage device 1000 may include a memory card or a detachable mobile storage device. The storage device 1000 is used in connection to a host 2000, and transmits and receives data to and from the host 2000 via a host interface. The storage device 1000 may receive power from the host 2000 and perform an internal operation.

The NVM 200 may be a flash memory or the like, and the memory controller 100 may control the NVM 200, determine the performance bottleneck of the buffer memory 300, and accordingly manage the buffer memory 300, as described above. The buffer memory 300 is used to buffer data to be transmitted from the host 2000 to the NVM 200 or data to be transmitted from the NVM 200 to the host 2000, which have been described before and thus will not be described in detail herein.

Referring to FIG. 7, the storage device 1000 according to the disclosure may be an SSD. Since the SSD 1000 is connected to the host 2000, the host 2000 may write data to the SSD 1000 or read data stored in the SSD 1000. The SSD 1000 may exchange signals with the host 2000 via the host interface and receive power through a power connector. The SSD 1000 may include a plurality of NVMs 200 and an SSD controller. The NVMs 200 may be implemented as PRAM, MRAM, ReRAM, FRAM, or the like as well as flash memory. The plurality of NVMs 200 may be connected to the SSD controller through a plurality of channels. In this case, one or more NVMs 200 may be connected to one channel, and NVMs 200 connected to one channel may be connected to the same data bus.

The memory controller 100 according to the disclosure may be provided as the SSD controller and transmit and receive signals to and from the host 2000 via the host interface. Commands, addresses, data, and so on may be transmitted in signals, and data is written to or read from an NVM 200 according to a command from the host 2000.

As is apparent from the foregoing description, according to the disclosure, occurrence of a performance bottleneck is predicted by monitoring traffic in a buffer memory in real time. Based on the prediction, data is directly transmitted from a host to a storage medium without passing through a write buffer in response to a write command from the host, and read prefetch is skipped after reading is completed, in response to a read command from the host. Therefore, a buffer may be managed efficiently particularly when an HBM is used as the storage medium.

While the disclosure has been described in detail with reference to specific embodiments, the embodiments are intended only for describing the disclosure, not limiting the disclosure. It is apparent to those skilled in the art that many variations or modifications can be made without departing the scope and spirit of the disclosure.

Simple modifications and changes of the disclosure fall within the scope of the disclosure and the specific protection scope of the disclosure will become apparent from the appended claims.

What is claimed is:

1. A memory controller for performing a buffering operation of temporarily storing data to be written to a non-volatile memory and data to be read from the non-volatile memory in a buffer memory, the memory controller comprising:
 a buffer request queue configured to store a plurality of buffer write requests requesting data to be temporarily stored in the buffer memory and a plurality of buffer read requests requesting data stored in the buffer memory to be read;

a buffer traffic monitor configured to calculate the total amount of requested data in real time by summing the lengths of data specified in the respective buffer write requests and the respective buffer read requests stored in the buffer request queue; and a buffer manager configured to control execution of the buffering operation by setting an execution ratio based on the total amount of requested data calculated in real time, wherein the buffer manager is configured to divide the buffering operation into write buffering for temporarily storing data to be written to a non-volatile memory in the buffer memory in response to a write command from a host and read prefetch for predicting a second read command to be generated successively after processing a first read command from the host, and temporarily storing data to be read based on the prediction in the buffer memory, and control execution of each of the buffer writing and the read prefetch, wherein the buffer manager is configured to control execution of the write buffering by setting a first execution ratio, and execution of the read prefetch by setting a second execution ratio equal to or different from the first execution ratio, wherein the buffer manager is configured to randomly select some of a plurality of write commands according to the first execution ratio and execute the write buffering only for the selected write commands, and wherein the buffer manager is configured to randomly select some of a plurality of first read commands according to the second execution ratio and execute the read prefetch only for the selected first read commands.

2. The memory controller according to claim 1, wherein the memory controller is configured to execute the buffering operation according to an execution ratio having a specific initial value, and when the total amount of requested data calculated in real time is larger than a preset upper limit, the buffer manager is configured to decrease the execution ratio.

3. The memory controller according to claim 2, wherein the buffer manager is configured to repeatedly decrease the execution ratio until the total amount of requested data calculated in real time is equal to or larger than a preset lower limit and equal to or less than the upper limit.

4. The memory controller according to claim 3, wherein when the total amount of requested data calculated in real time is less than the lower limit, the buffer manager is configured to increase the execution ratio.

5. The memory controller according to claim 4, wherein even though the total amount of requested data calculated in real time is less than the lower limit, when the set execution ratio is equal to the initial execution ratio, the buffer manager is configured to maintain the execution ratio.

6. The memory controller according to claim 4, wherein the buffer manager is configured to adjust the execution ratio by applying an execution ratio variation preset for each value range according to a value by which the execution ratio is larger than the upper limit and a value by which the execution ratio is less than the lower limit.

7. A storage device comprising:
a non-volatile memory;
a buffer memory; and
the memory controller according to claim 1.

* * * * *